United States Patent Office 3,363,178
Patented Jan. 9, 1968

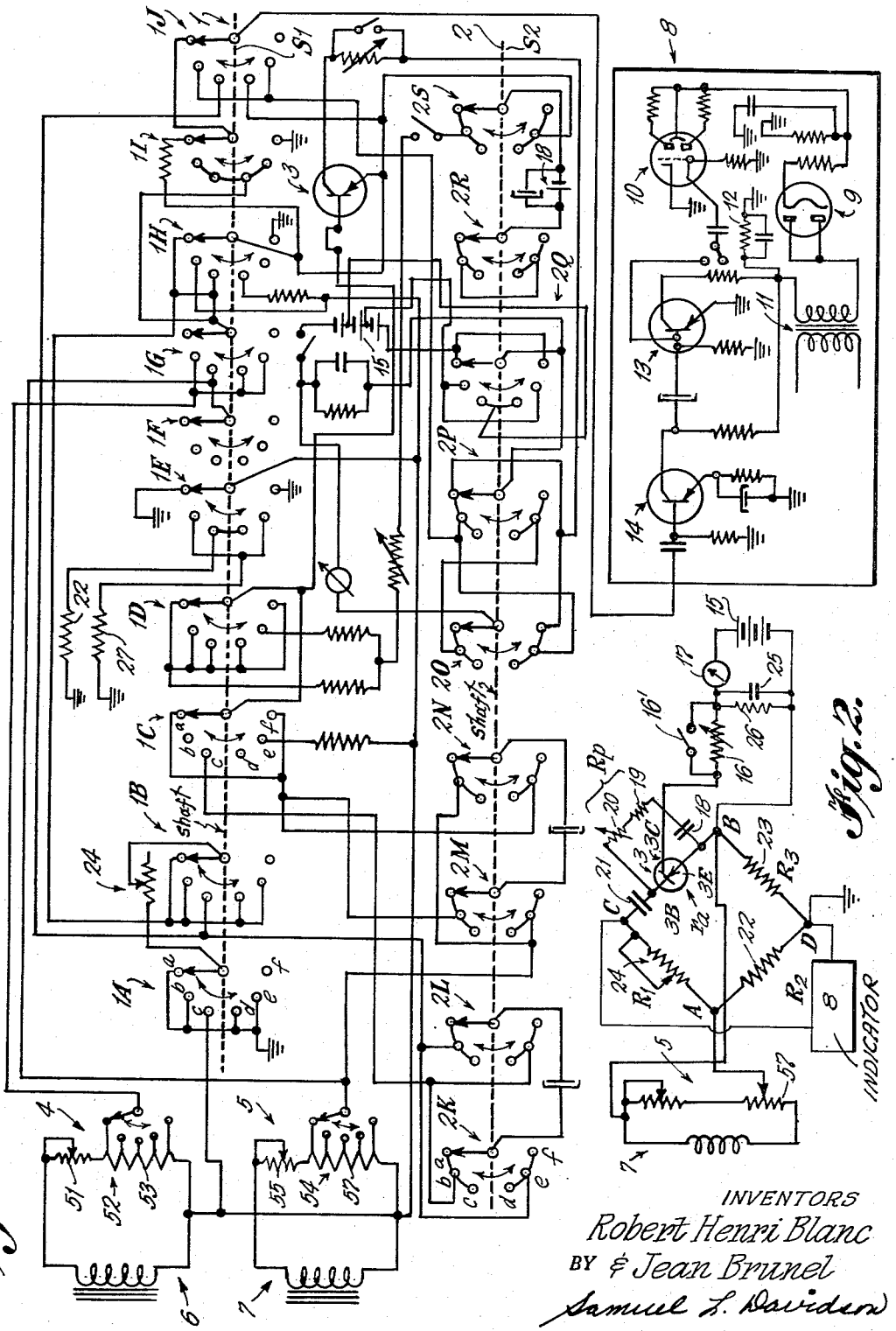

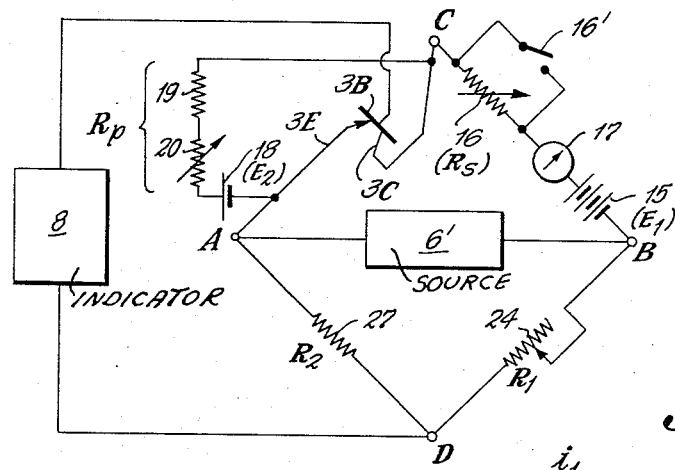
Fig. 3.
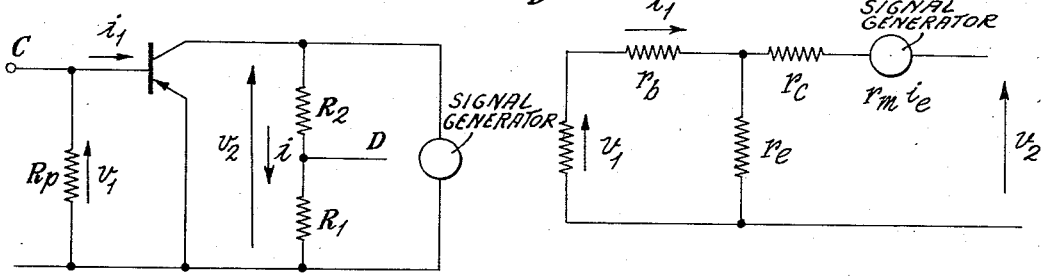
Fig. 5.
Fig. 4.
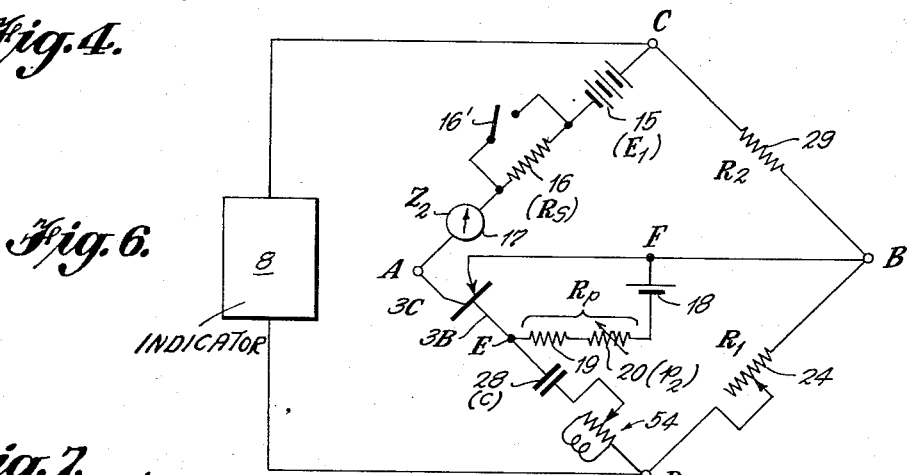
Fig. 6.
Fig. 7.
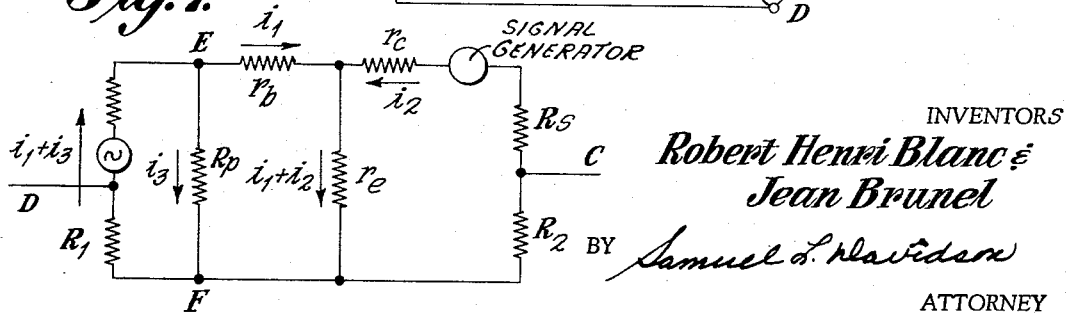
INVENTORS
Robert Henri Blanc &
Jean Brunel
BY Samuel L. Davidson
ATTORNEY

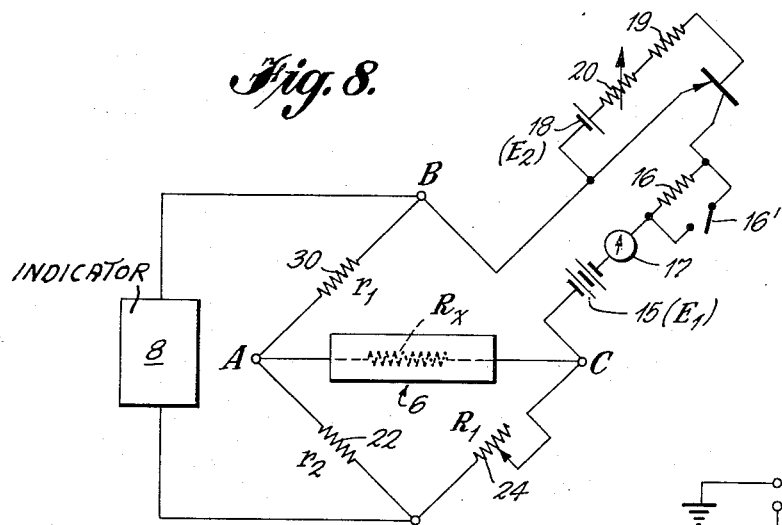
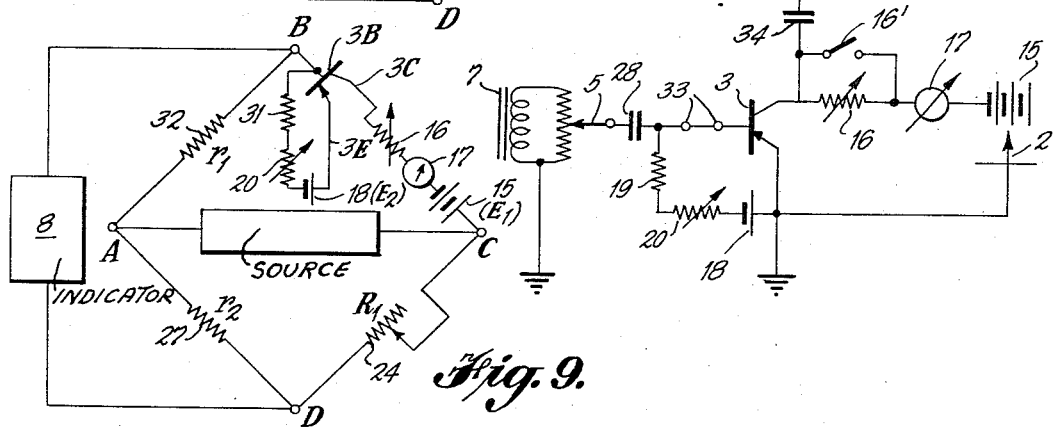
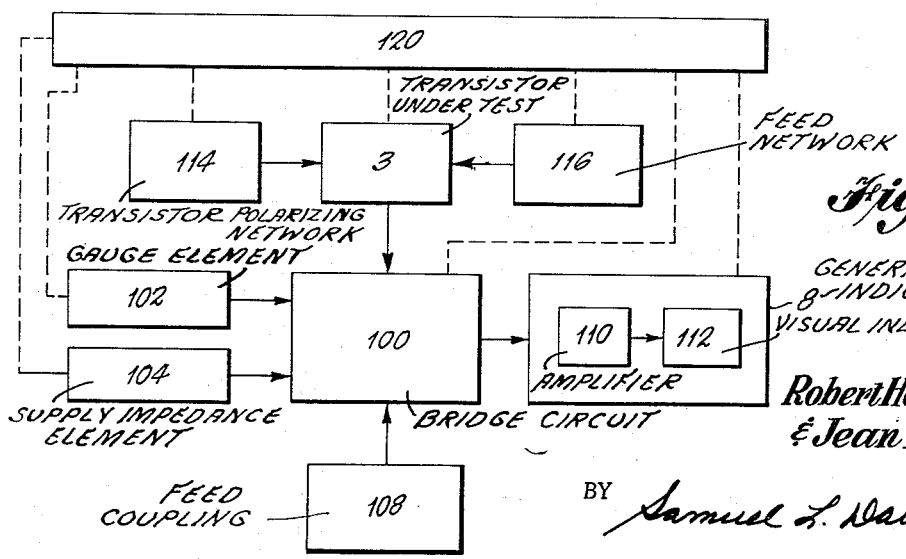

3,363,178
BRIDGE APPARATUS FOR DETERMINING THE HYBRID PARAMETERS OF A TRANSISTOR UNDER TEST
Robert Henri Blanc, Villa la Baudelle, 5 Impasse Arnaud, Marseille 7, France, and Jean Brunel, 9 Rue Pierre Dupre, Marseille 8, France
Filed July 28, 1961, Ser. No. 130,219
6 Claims. (Cl. 324—158)

This invention relates to methods and apparatus for determining transistor characteristics, and more particularly to methods and apparatus for determining the $h$ coefficients of junction transistors, as well as distortion characteristics thereof.

With many transistor applications, a signal voltage (or current) of small amplitude is applied between two transistor terminals, and it is desired to determine the currents and voltages that flow in the system in response to such signal. Conventional practice provide for treating such signal, and its resulting effects, as small alternating voltages and currents which are superimposed upon the DC voltage and currents present in the transistor under consideration in the absence of the applied small alternating signal.

As explained by Terman in his volume entitled, Electronic and Radio Engineering, 4th edition, McGraw-Hill, New York, 1955, section 21–11, the "small-signal theory" of the transistor begins by regarding the transistor as a "black box" with two input and two output terminals. Consistent with this theory, one of the actual transistor terminals, either the base or the emitter terminal, is necessarily common to both input and output. Without considering in detail the exact construction within the black box, but knowing that the "black box" functions linearly with respect to small superimposed (or incremental) voltages and currents, one can, from the principals of network theory, express the functional relations of the "black box" as follows:

$$v_1 = h_{11}i_1 + h_{12}v_2 \qquad \text{Equation 1}$$

$$i_2 = h_{21}i_1 + h_{22}v_2 \qquad \text{Equation 2}$$

In the foregoing equations, if the transistor is connected with a common emitter, and accordingly, $v_1 = v_{be}$ is the base emitter voltage in question, $i_1 = i_b$ is the base current in question, $v_2 = v_{ce}$ is the collector emitter voltage, and $i_2 = ic$ is the collector current. $v_1$, $v_2$, $i_1$, and $i_2$ are, of course, in accordance with the foregoing theory, the superimposed incremental voltages and currents associated with the emitter and collector electrodes.

Now, the $h$'s which appear in Equations 1 and 2 above are the parameters that define the characteristics of the transistor for small voltages and currents superimposed upon the conditions established by the emitter and collector bias or polarizing voltages. The $h$'s are commonly referred to as the hybrid parameters of a junction transistor or as the transistor coefficients. However, for purposes of simplicity, as well as for purposes of consistency, the $h$'s are referred to in this specification and the appended claims as transistor coefficients.

These coefficients have the following general equational definitions:

$$h_{11} = \frac{\partial V_1}{\partial I_1}\bigg|_{V_2 \text{ constant}} = \frac{V_1}{i_2}\bigg|_{v_2=0}$$

Equation 3

$$h_{22} = \frac{\partial I_2}{\partial V_2}\bigg|_{I_1 \text{ constant}} = \frac{i_2}{v_2}\bigg|_{i_1=0}$$

Equation 4

$$h_{12} = \frac{\partial V_1}{\partial V_2}\bigg|_{I_1 \text{ constant}} = \frac{v_1}{v_2}\bigg|_{i_1=0}$$

Equation 5

$$h_{21} = \frac{\partial I_2}{\partial I_1}\bigg|_{V_c \text{ constant}} = \frac{i_2}{i_1}\bigg|_{v_2=0} = -\alpha_0$$

Equation 6

The foregoing equations constitute exact definitions of the $h$ coefficients, but the same are often defined in words as follows:

COMMON EMITTER CONNECTION $h_{11e}$ — "Dynamic resistance of base emitter circuit with collector voltage constant" or "input impedance when the output is short-circuited."

$h_{12e}$ — "Coefficient of effect of collector voltage on the open-circuit voltage at the base" or "feedback factor or reverse $\mu$."

$h_{21e}$ — "Ratio between the short-circuit collector current and the applied base current." It is the "current amplification $\beta$."

$h_{22e}$ — "Dynamic conductance - reciprocal of dynamic resistance of collector emitter circuit with constant base current." It is the "output admittance when the base is open-circuited."

COMMON BASE CONNECTION $h_{22b}$ — "Output admittance when the emitter is open-circuited."

While the $h$ coefficients provide basic information as to the operating characteristics of a junction transistor, one other characteristic of a junction transistor is important, namely, the largest amplitude input signal which may be applied to a transistor functioning at a given operating point without producing distortion thereof. Thus, in order to determine the operating characteristics and/or functional response of a given transistor, it is desirable to determine the $h$ coefficients thereof as well as the peak input signal which can be applied without causing distortion. In fact, it is desirable to determine the distortion characterized initially so as to be able to select a suitable operating point for determination of the $h$ coefficient.

Realizing the advantages of obtaining the aforesaid coefficients and/or operating characteristics, prior workers in the art have made various suggestions as to circuits which can be used to make necessary measurements. To the best of our knowledge, while some of the prior suggestions are practical, the information gained therefrom is incomplete, and while some other of the suggestions yield somewhat complete information, these other suggestions are lacking in practical aspects. Moreover, despite all of the prior suggestions, there remains a need for a universal measuring instrument which is comparatively small and relatively inexpensive, and which in addition permits the determination of the aforesaid coefficients and operating characteristics.

Accordingly, one of the primary objects of the present invention is to provide a universal measuring instrument that is neither cumbersome or expensive, but which permits ready and direct determination in particular of the four $h$ coefficients in common emitter connection of a transistor as well as the peak inputs signal which can be applied without causing distortion.

A still further primary object of the present invention is to provide methods of determining the $h$ coefficients and operating characteristics of a transistor, which methods require only the use of simple electrical expedients for the determination of any coefficient or characteristic.

Additional, yet specific primary objects of the present invention are: (a) to provide a method and apparatus for determining the dynamic input resistance of a transistor by means of a Wheatstone bridge-type circuit having the transistor coupled-in in common emitter connection, and forming part of, at least one branch thereof (b) to provide a method and apparatus for determining the dynamic output conductance of a transistor by means of a Wheatstone bridge-type circuit having the transistor coupled-in in both common base and/or common emitter connections, and forming at least part of, one branch thereof; (c) to provide a method and apparatus for determining the coefficient of the effect of collector voltage on the base voltage $\mu$ in a transistor by utilizing a Wheatstone bridge-type circuit having the transistor coupled-in in common emitter connection, and forming at least part of, one branch thereof; and (d) to provide a method and apparatus for determining the direct current gain $g'_c$ of a transistor, and more particularly the maximum current gain $\beta$ of a transistor, by utilizing a Wheatstone bridge-type circuit having the transistor coupled-in in common emitter connection, and forming at least part of, one branch thereof.

Still a further, primary object of the present invention is to provide a system adapted to be packaged or housed in a small casing for determining all of the aforesaid coefficients, and in particular the $h_{ije}$ parameters, and operating characteristics of a transistor, which system incorporates a minimum number of electrical resistance and capacitance elements, and switching means for coupling the resistance and capacitance elements with the transistor under test so as to form Wheatstone bridge circuits adapted to yield the desired information. More specifically, in this connection, an important object of the present invention is to provide such a system free of inductive elements serving only as impedances, and wherein a calibrated resistance element forming part of the system is so coupled therein for any particular determination that the calibration thereon give a direct indication of the value to be ascertained.

Still additional, further, yet even more specific objects of the present invention are: (a) to provide methods, apparatus, and systems conforming with all of the preceding objects, which allow for readily ascertaining any given coefficient or characteristic upon mere adjustment of switches and reading of a calibrated scale; (b) to provide a system conforming with all of the preceding objects and incorporating a calibrated resistor element having a plurality of scales thereon which permit direct reading, without interpolation, of any given $h$ coefficient of a transistor; (c) to provide systems conforming with all of the preceding objects and adapted to measure, where necessary, the four $h_{ije}$ coefficients where $i, j=1, 2$) for a particular transistor coupled in circuit with a common emitter and the $h_{22b}$ coefficient for a particular transistor coupled in circuit with a common base; (d) to provide a system conforming with the preceding objects and incorporating variable resistance elements adapted to be coupled with the feed power supply and polarizing or bias power supply for the transistor whereby a given preselected operating point can be readily established, to permit determination of the $h$ coefficients aforementioned; (e) to provide a system conforming with all of the preceding objects and incorporating a null indicator which yields extremely accurate results while requiring a minimum of parts; (f) to provide such a system wherein input signals can be readily developed from transformer secondaries coupled with suitable taps so as to provide adjustable input voltages; (g) to provide such a system wherein a "short-circuit" switching means is incorporated to permit determination of certain $h$ coefficients for common emitter circuits; (h) to provide such a system which incorporates means adapting the system to be coupled to a cathode ray oscilloscope for initial determination of a suitable operating point; and (i) to provide such a system wherein many of the coefficients can be determined while the transistor functions at a single given operating point.

In additon to all of the foregoing objects, the invention has as one of its more important auxiliary objects, the provision of an improved null indicator which requires a minimum number of rectifying means, and which eliminates the necessity for complex and bulky battery banks.

The system provided by the invention for determining the aforesaid $h$ coefficients of a transistor, and/or characteristics thereof, comprises basically means for applying an alternative voltage between two terminals of the transistor; means for biasing as polarizing the transistor at a given operating point; impedance means including a plurality of impedance elements, at least one of which is adjustable and calibrated; an indicating means; and switching means for selectively coupling the impedance elements to the transistor and indicating means in a Wheatstone bridge-type circuit whereby the value of a given $h$ coefficient can be read directly from the calibrated impedance element when the indicating means displays a predetermined indication. The system further includes means adapted to couple the system with the cathode ray oscilloscope, or like type device, whereby visual indication of distortion is given.

The invention lies in the construction, combination, and arrangement of the various components which serve to attain all of the objects set forth above, and will be better understood, when consideration is given to the following detailed description. The description refers to the annexed drawings presenting preferred and illustrative embodiments of the invention, as well as explanatory circuits helpful in connection with comprehending the invention.

In the drawings:

FIGURE 1 is a schematic circuit diagram of an overall system constructed in accordance with the present invention;

FIGURE 2 is a schematic diagram of the effective circuit of the system utilized for measuring $h_{11e}$ and more generally $r_{be}$;

FIGURE 3 is a schematic diagram of the effective circuit of the system utilized for measuring $h_{12e}$;

FIGURE 4 is an equivalent circuit outside the transistor of that presented in FIGURE 3;

FIGURE 5 is the classical inside transistor equivalent circuit for a common emitter system;

FIGURE 6 is a schematic diagram of the effective circuit of the system utilized for measuring $h_{21e}$ and more generally the current gain (no maximum) $g'_c$;

FIGURE 7 is an equivalent circuit for that of FIGURE 6;

FIGURE 8 is a schematic diagram of the effective circuit of the system utilized for measuring $h_{22e}$ with a common emitter construction;

FIGURE 9 is a schematic diagram of the effective circuit of the system utilized for measuring $h_{22b}$ with a common base construction;

FIGURE 10 is a schematic diagram of the effective circuit of the system utilized for determining distortion characteristics of a transistor under test;

FIGURE 11 is a schematic block diagram of the overall system provided by the invention;

Figure 12:
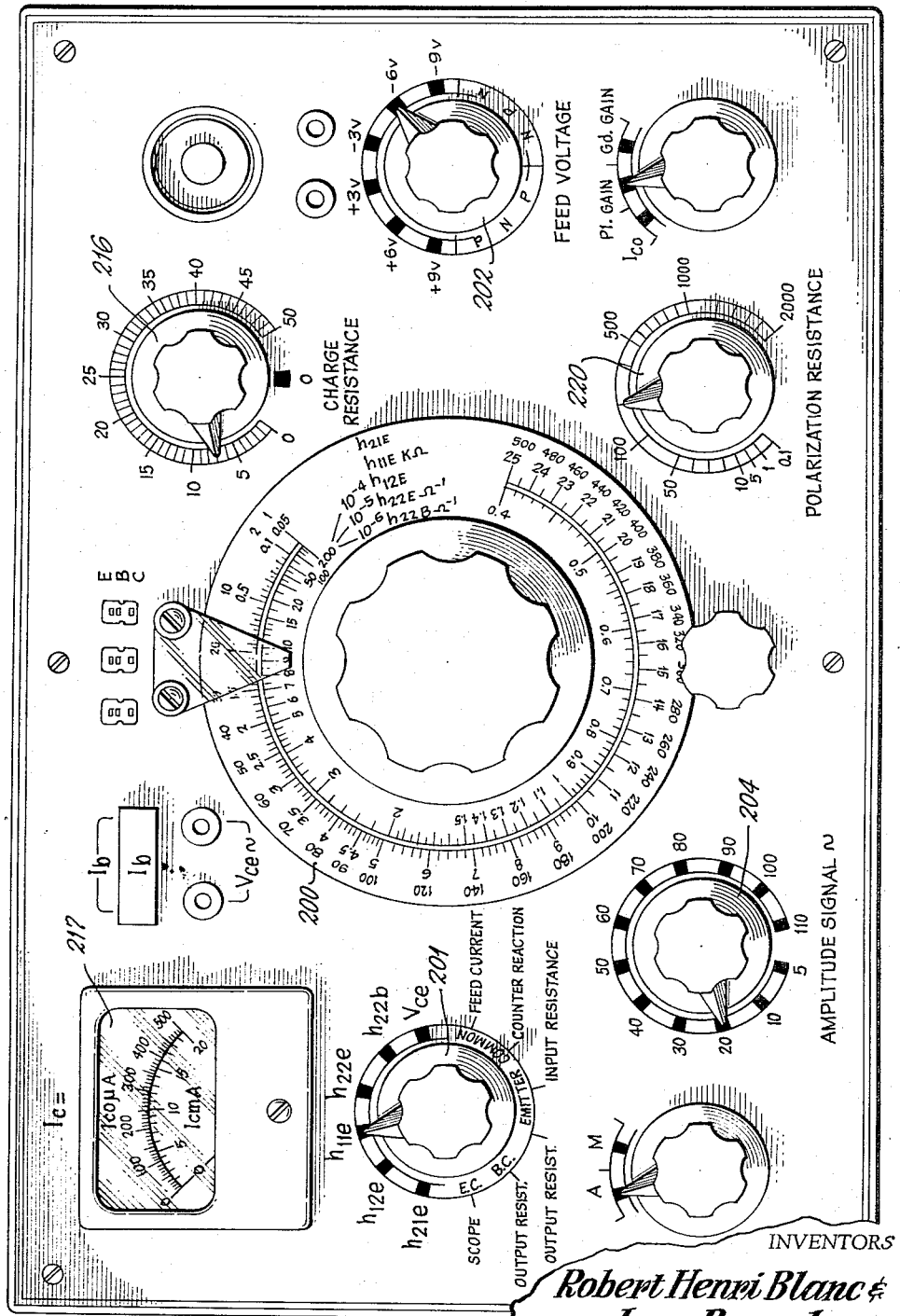
FIGURE 12 is a plan view of the face of an instrument constructed in accordance with the present invention.

By referring to FIGURE 1 which, as suggested above, presents a schematic diagram of an overall system constructed in accordance with the present invention, it will be noted that such system incorporates means in the form of transformer secondaries 6 and 7 for developing an alternating voltage, means in the form of a battery 18 for supplying a bias or polarizing voltage, a plurality of resistances and capacitances defining impedance means, an indicating means generally designated by the numeral 8, and switching means generally designated by the numeral 1 for selectively coupling the impedance elements to a transistor 3, to one another, and to the indicating means 8.

As explained in more detail below, for any given measurement, the impedance element generally designated by the numeral 24, which comprises a calibrated potentiometer, forms one branch of a Wheatstone bridge-type circuit. For such a determination, moreover, one of the secondaries 6 or 7 is coupled to the bridge so as to apply an alternating voltage between two terminals of the transistor 3 undergoing test, and the indicating means 8 is coupled with the bridge so as to enable determining balanced condition thereof. The operation of the system is such that the value of a given $h$ coefficient can be directly read from the calibrated impedance element 24 when the indicating means 8 displays a predetermined indication, preferably a null or zero.

The switching means 1 comprises a plurality of switching elements 1A, 1B, 1C, 1D, 1E, 1F, 1G, 1H, 1I, and 1J. Each of the switching elements can be moved to one of six positions, $a$, $b$ $c$, $d$, $e$, and $f$, each of which correspond to one of the six possible functions to be measured. The switching elements preferably are all part of a wafer switching means having a single shaft S1 which is common to all of the elements of switching means 1, whereby simultaneous operation and control is achieved. More specifically, the movable contact arm of each of the elements 1A, 1B, etc. is coupled on the common shaft S1 so that upon rotation of such shaft, all of these elements move to corresponding respective positions, i.e., when the movable contact member of switching element 1J is in position $b$, then the movable contact member of switching element 1A, 1B, 1C, 1D, 1E, 1F, 1G, and 1H is also in its corresponding $b$ position.

A switching means 2 is incorporated in the system to extend the field of application thereof to npn and pnp transistors, as well as for purposes of permitting variation in bias or polarizing voltage. Switching means 2 like switching means 1 comprises a plurality of switching elements namely 2K, 2L, 2M, 2N, 2O, 2P, 2Q, 2R, and 2S, and each element comprises several operating positions shown as $a$, $b$, $c$, $d$, $e$, and $f$. With the provision of switching means 2, it is possible with the system of the invention to fix at a predetermined value, the collector voltage suitable for the particular common electrode circuit set up for the transistor 3 undergoing test. As with switching means 1, the movable contact arm of each of the switching elements of switching means 2 is carried by a common shaft S2 whereby all switching elements of switching means 2 are moved simultaneously from position to position. Preferably, six positions are provided for each switching element of switching means 2, three of these positions being used for evaluations made with pnp transistors, and three of the positions being used for evaluations made with npn transistors.

In order to achieve selectable input voltages, a voltage divider 52 is coupled across the secondary 6 and a voltage divider 54 is coupled across the secondary 7. Voltage divider 52 comprises the adjustable rheostat 51 and a tapped resistance element 53, whereas voltage divider 54 comprises the adjustable rheostat 55 and the tapped resistor element 57. Cooperating with the taps on the resistor elements 53 and 57 are the switching elements 4 and 5 which can be moved from position to position to obtain desired alternating voltages. In particular, the contact arm of switching element 4 and the contact arm of switching element 5 are shown in the positions which they would occupy when it was desired to "pull" the maximum signal from either of the secondaries 6 or 7. As the switching members are moved counterclockwise from the position shown, the voltages appearing on the movable contact members progressively decrease.

The indicating means 8 may take any suitable form desired, but preferably comprises the arrangement shown in the drawing and provided by this invention. It contains an amplification system of one or two stages, which are coupled to the input of a visual tuning indicator, such as that commonly known as a "cathodic cross."

In accordance with the preferred embodiments of the invention, the amplifying system provided for the indicating means 8 includes a rectifier 9 comprising a miniature diode which furnishes a rectified high voltage consisting of part of the signal received from the secondary of input transformer 11, to the cathodic cross 10. A suitable bias network including the resistance 12 is provided for purposes of establishing the feed voltage of two transistor amplifiers generally designated by numerals 13 and 14. The provision of such bias network reduces the number of sources of rectifying current used, as should be readily apparent.

As explained in more detail below, the setting of the switching means 1 and 2 in any given preselected positions connects the system components for a particular measurement operation. For purposes of simplicity, FIGURES 2 through 10 present the basic circuits utilized for each measuring operation, and the following description centers about such figures. It will be understood that system components not shown in FIGURES 2 through 10 are still part of the system, but are not coupled with the transistor and/or indicating means for operation while making a particular measurement.

*Circuit for determining dynamic resistance $r_{be}$ and $h_{11e}$*

FIGURE 2 presents the circuit utilized for determining the dynamic resistance of the transistor 3 undergoing test. To establish the particular circuit connection shown in FIGURE 2, the switching means 1 is adjusted so that the movable contact arms of the elements thereof are in position $c$.

When the switching means 1 has been so adjusted, then a Wheatstone bridge is established. One arm of the bridge comprises the calibrated variable resistance element 24, and the other arm of the bridge comprises a capacitor 21 and the transistor 3 undergoing test.

Coupled between the emitter 3E of transistor 3 and the base 3B thereof, is a series circuit including bias as polarization battery 18, protective resistance 19, and polarization rheostat 20. This series circuit permits the fixing of the continuous base current at a predetermined value for a given operating point.

Coupled between the collector 3C of the transistor undergoing tests, and the emitter thereof, is another series circuit comprising rheostat 16, milliammeter 17, and feed battery 15. The rheostat 16 constitutes the load resistance $R_s$, variable at will; and the milliammeter 17 allows for setting the collector current for a predetermined operating point.

The small alternating signal to be applied to the transistor under test is obtained in this instance, from the secondary 7, or more particularly the tapped resistance element 57 coupled thereacross. It will be noted that the voltage divider 5 is coupled across the Wheatstone bridge between the terminals A and B. The null indicator or indicating means 8 is coupled across the bridge also but, between the terminals C and D thereof.

By virtue of the connections established as set forth above, the alternating signal emanating from secondary 7 is supplied to the base 3B of transistor 3 through the condenser 21 which is coupled in series with the transistor in the "transistor branch of the bridge." The condenser 21 has such a value as to readily pass alternating current or voltage, but of course it does not permit the flow of direct current. The dynamic resistance of the transistor to be measured, namely $r_{be}$, is large compared to the impedance offered signals by the condenser 21, i.e., the condenser 21 is chosen so as to have a negligible impedance at the operating frequency in comparison to the dynamic resistance $r_{be}$, of the transistor to be measured.

On the other hand, the polarization resistance $R_p$ constituted by the sum of resistances 19 and 20 is large compared to the dynamic resistance $r_{be}$ of the transistor to be measured. The polarization resistances $R_p$ is coupled in parallel with the resistance to be measured, and since it can be suitably chosen, the preferred embodiment of the invention provides for adjusting the value thereof to compensate for any error which may be introduced by virtue of the inclusion of the series capacitance 21. More specifically, even though the value of the capacitance and the values of the resistances 19 and 20 which constitute $R_p$ have been chosen so as to have only a negligible affect on the resistance being measured, such negligible affect can be effectively eliminated by utilizing the resistances 19 and 20 to compensate for any effect of the capacitance 21, or vice versa.

After the bridge circuit is set up as shown in FIGURE 2, then one proceeds to adjust the variable rheostat 24 so as to balance the bridge, i.e., so as to obtain a null or zero on the indicating means 8. When this null is obtained, one can read directly on a graduated scale provided on the variable resistance element 24 the value of $r_{be}$ for a common emitter construction.

In order to obtain the value for $h_{11e}$ for a common emitter circuit, one merely closes the switch 16' thereby short-circuiting the rheostat 16. Closing of the switch 16' annuls the collector voltage $v_{ce}$ by means of the condenser 25 of high capacity and escape resistance 26 coupled in parallel thereto. It will be noted that the capacitance 25 and the resistance 26 are coupled directly across the milliammeter 17 and battery 15.

After the switch 16' has been closed, then the adjustable resistance element 24 is again operated to balance the bridge, and a direct reading of $h_{11e}$ for a common emitter circuit can be read directly from the calibrations on element 24.

*Theory of operation of circuit of FIGURE 2*

Preferably, in the circuit of FIGURE 2, the resistance 22 ($R_2$) is made equal to the resistance 23 ($R_3$). Thus, when the bridge is balanced, the variable resistance element 24 ($R_1$) is equal to the resistance of the transistor branch. More specifically, $$R_1 = \frac{1}{|CW|} + \frac{1}{\frac{1}{R_p} + \frac{1}{r_{be}}}$$

Equation 7

The effects of the condenser C and of the resistance $R_p$ compensate each other in part and their impedance values have been chosen separately such that $$\frac{1}{|2\pi fC|} \ll r_{be} \text{ and } R_p \gg r_{be}$$

Accordingly, $$R_1 = r_{be}$$

Equation 8

Now, assume that the switch 16' is closed. In this instance, the rheostat 16 ($R_S$) is short-circuited and effectively eliminated from the circuit. Accordingly, the collector alternating voltage, $v_{ce}$ is effectively shorted via the switch and condenser 25 and resistance 26. Thus $v_{ce}=0$. This means that a common emitter circuit exists, and thus rebalancing of the bridge after closing switch 16' results in adjusting the variable resistance element 24 ($R_1$) such that it equals $r_{be}$ for a common emitter circuit. By definition, therefore, $R_1 = r_{be} = h_{11e}$.

*Determination of inverse voltage gain or coefficient of effect of collector voltage on base voltage $h_{12e}$ or feedback factor or reverse $\mu$*

FIGURE 3 presents the bridge circuit which results from adjusting the elements of switching means 1 to position $b$ of FIGURE 1. This bridge circuit is adapted to measure the transistor coefficient $h_{12e}$.

By referring to FIGURE 3 it will be noted that the bridge comprises a branch consisting of resistance 27, a branch consisting of the adjustable calibrated resistance element 24, a branch consisting of the collector feed network, and a branch consisting of the transistor emitter base circuit and polarization means therefor. As opposed to using the secondary 7 for supply of the applied signal, the circuit of FIGURE 3 utilizes the secondary 6 or more particularly, a voltage from the tapped resistance 57 which is conducted through the switching element 5. For convenience, however, this source is designated generally as 6'. The applied voltage is coupled between the terminals A and B of the bridge of FIGURE 3 and the null indicator or indicating means 8 is coupled between the transistor base 3B and the terminal D which is electrical ground in this instance.

It will be noted that the feed circuit comprising rheostat 16, milliammeter 17, and battery 15 is coupled with the collector, as in the case with the circuit with FIGURE 2, but the rheostat 16 is short-circuited by means of the switch 16'. Polarization of the transistor is obtained through the battery 18 which is coupled in series with the protective resistance 19 and variable polarizing resistance 20. Also as in the case with the circuit of FIGURE 2, the continuous polarizing current is regulated to maintain the transistor at a particular operating point by means of adjustment of rheostat 20. Again the sum of resistances 19 and 20, $R_P$, is large in comparison with the dynamic resistance $r_{be}$ of the transistor, and as a result $R_p$ has no substantial effect on the measurement.

The source which is generally designated by the numeral 6' in FIGURE 3 applies a signal between the collector 3C and emitter 3E of the transistor 3. To this applied signal $v_{ce}$ corresponds an alternating voltage $v_{be}$ between the base and the emitter. The null indicator 8 is connected on one hand to the base 3B and on the other hand to ground, or to the terminal $d$ of the bridge. Accordingly, when the bridge is balanced, no current runs through the null indicator, i.e., there is no base current $i_1$, and the definition $h_{12e}$ for a common emitter circuit is satisfied.

The current which passes through the adjustable calibrated resistance element 24 under these conditions has the same value as the current passing through the resistance 27 connected between emitter and base. The ratio of the potential differences at the terminals A and B of the bridge is therefore equal to the ratio of the resistances R1 and R2. With equilibrium of the bridge, or balancing thereof, this ratio is very substantially equal to the rate of counterreaction, or coefficient of applied collector voltage on the open-circuit voltage at the base, i.e. $h_{12e}$.

*Theory of operation of circuit of FIGURE 3*

In essence, coefficient $h_{12e}$ may be defined as the coefficient of amplification of inverse voltage from the output circuit to the input circuit of a transistor with the input circuit being open. The equations of the quadropole representative of the transistor 3 which is schematically represented in FIGURE 5 are as follows:

$$v_1 = (r_b + r_e)i_1 + r_e i_2 \quad \text{Equation 9}$$

$$v_2 = -(r_m - r_e)i_1 + (r_c - r_m + r_e)i_2$$

Equation 10

$$\mu = h_{12} = \frac{v_1}{v_2}\bigg|_{i_1=0} \quad \text{Equation 11}$$

$$= \frac{r_e}{r_c - r_m + r_e} \approx \frac{r_e}{r_c - r_m} \approx \frac{r_e}{(1-\alpha)r_c}$$

Equation 12

Now, if the base is not connected in the circuit, and if one brings the collector to the potential $v_2$ which gives to a collector current $i_2$, then the base takes the potential $v_1 = r_e i_c$.

At equilibrium, $i_e = 0$, and accordingly by the bridge theory $$\frac{v_1}{v_2 - v_1} = \frac{R_1}{R_2} \qquad \text{Equation 13}$$

Although the foregoing can be achieved in theory, because of the necessity to polarize the transistor, the input circuit to the transistor is closed by the high polarizing resistance $R_P$ comprising resistors 19 and 20. A current $i_e$ which is not equal to 0 thus exists.

Hence, one does not measure exactly $h_{12e}$, but a closely related value. This closely related value, is however, the only one which presents some practical application.

To better understand the operation of the circuit of FIGURE 3, reference should be made to FIGURE 4 which represents an equivalent circuit diagram for the circuit of FIGURE 3.

When the circuit of FIGURE 4 is a equilibrium, $v_C = v_D$, and there is no current through in the null indicator (not shown) as connected betyeen CD shown. The current $i_1$ then passes through $R_P$ and the same current, $i$, passes through R1 and R2. There are for this condition three equations outside of the transistor:

$$v_1 = -R_P i_1 \qquad \text{Equation 14}$$

$$v_2 = (R_1 + R_2) i \qquad \text{Equation 15}$$

$$v_A - v_B = R_1 i + R_P i_1 = 0 \qquad \text{Equation 16}$$

By manipulation $$\frac{v_1}{v_2} = \frac{R_1}{R_1 + R_2} \qquad \text{Equation 17}$$

and $$\frac{R_1}{R_2} = \frac{v_1}{v_2 - v_1} \qquad \text{Equation 18}$$

i.e. the measurement of Equation 18 is that which is made for $h_{12e}$.

Just as there are three equations outside the transistor, there are three equations inside the transistor according to the classical circuit diagram of FIGURE 5, namely, Equation 9 above
Equation 10 above and from equation 9:

$$i_2 = -\frac{(R_P + r_b + r_e)}{r_e} i_1 \qquad \text{Equation 19}$$

By transposition and substitution one obtains $$\frac{R_1}{R_2} = \frac{v_1}{v_2 - v_1} = \frac{-R_P}{-(r_m - r_e) - (r_c - r_m + r_e)\frac{R_P + r_b + r_e}{r_e + R_P}}$$

Equation 20

$$= \frac{R_P r_e}{(r_c - r_m)(R_P + r_b) + r_e(r_c + r_b)} \approx \frac{1}{\frac{(1-\alpha)r_c}{r_e}\left(1 + \frac{r_b}{r_p} + \frac{r_e}{R_P}\right)}$$

Equation 21

But $$\frac{1}{\mu} = \frac{(1-\alpha)r_c}{r_e}$$

and thus $$= \frac{R_1}{R_2}\left[1 + \frac{1}{R_P}\left(r_b + \frac{r_e}{1-\alpha}\right)\right]$$

Equation 22

Moreover $$h_{11e} \approx r_b + \frac{r_e}{1-\alpha}$$

and accordingly $$\mu = h_{12e} = \frac{R_1}{R_2}\left(1 + \frac{h_{11e}}{R_P}\right)$$

Equation 23

From this relationship, it should be apparent that the resistance of polarization need only be substantially large in relation to the input resistance $r_{be}$ of the transistor to obtain $$\mu = h_{12e} \approx R_1/R_2 \qquad \text{Equation 24}$$

Thus, if the scale on the resistance element R1, which takes the form of the variable resistance 24, is calibrated so as to read the ratio of $R_1$ to $R_2$, then a direct reading of $h_{12e}$ can be obtained by balancing the bridge circuit present in FIGURE 3.

*Determination of the direct current amplification $g'_c$ and of the direct maximum current amplification $h_{21e}$ ($=\beta$) of the transistor mounted with a common emitter*

The bridge circuit presented in FIGURE 6 represents the connections which are made when the movable contact arms of the switch elements of switching means 1 are moved to position a of FIGURE 1.

Generally, in the circuit of FIGURE 6, the adjustable calibrated resistance element 24 comprises branch BD of the bridge circuit, resistance 29 comprises branch BC of the bridge circuit, the collector feed circuit comprises branch AD of the bridge circuit, and the transistor and polarizing circuits thereof as well as the supply of potential are placed in branch AD of the bridge circuit. Branch AC consists of the milliammeter 17, the rheostat 16, and the battery 15 to which reference has been made hereinabove.

Specifically, branch AD of the bridge circuit comprises the secondary 7 and associated voltage dividing network 54 which has been only schematically shown in FIGURE 6. In addition, the capacitor 28 is connected in series between the output of the voltage dividing circuit 54, and the base 3B of the transistor 3 undergoing test. The collector is connected directly with the terminal A of the bridge and the feed circuit comprising branch AC thereof.

The alternating signal emanating from the secondary 7 is applied through the high capacity condenser 28 to the base 3B. As a result, the alternating signal produces in the variable resistance element 24, a voltage drop which is opposite to that produced in the low value resistance 29.

When the null indicator 8 reads zero, i.e., at bridge equilibrium, the ratio of resistance 29 to resistance 24 is equal to the ratio of the input and output intensities, that is to say, to the current amplification. The latter value is read directly on the graduated scale of the adjustable resistance element 24.

As in the case with other bridge circuits, in order to obtain the maximum amplification coefficient $h_{21e}$ with the common emitter circuit, the variable resistance 16 is short-circuited and balance of the bridge is reestablished by adjustment of the resistance element 24, whereupon the common emitter maximum current gain $\beta$ is obtained.

*Theory of operation of the circuit of FIGURE 6*

The transistor is polarized by the battery 18 ($E_2$) in series with the protection resistance and rheostat 19 and 20, respectively, which permit fixing of the continuous base current, i.e., one of the two coordinates of the operating point. The voltage $V_{CE}$ is then that of the battery $E_1$ when the rheostat 16 is short-circuited.

When a signal is applied to the base 3B through the condenser 28, such signal passes through the resistance element 24 ($R_1$) where it creates a drop in the voltage.

This drop in voltage is compared with the voltage produced by the collector current $i_c$ passing through the resistance 29 ($R_2$) which is sufficiently weak in comparison to the output resistance of the transistor so that it effectively works in a short-circuit (as long as the rheostat 16 ($R_S$) is short-circuited) i.e., with amplification of the maximum current.

The amplification is given by the relationship $$\frac{i_c}{i_b}$$

Neglecting, as a first approximation, the alternating current $i_p$ which joins $i_b$ in $R_1$, one can define the amplification by the drops in voltage which these currents produce in $R_1$ and $R_2$ and accordingly, establish the following equation, when these voltages are the same $$\beta = i_c/i_b = R_1/R_2 \qquad \text{Equation 25}$$

The resistance $R_2$ is precisely known, and the resistance $R_1$ which comprises a rheostat graduated with $R_2$ taken as a unit, i.e., it furnishes a direct reading of the ratio of $R_1/R_2$, or in this instance a direct reading in units of current amplification. If one sets $R_1$ so that the alternating voltage between C and D is zero, then one reads $\beta$, directly on the exterior graduation scale of the resistance element 24 ($R_1$).

In practice, it is important to be able to measure the amplification of the current with the charge resistance 16 ($R_S$) given to begin with. It is then sufficient to insert this resistance into the circuit of the collector. $I_c$ is still read from the milliammeter 17 and $V_{ce}$ becomes equal to $E_1 - R_S I_c$. The new value of $g'_c$ is read directly, in the same manner as before.

The alternating current equivalent circuit of FIGURE 6 is presented in FIGURE 7. By referring to this diagram it will be noted that the branch EF, i.e., the polarization branch, is equivalent to the resistance $R_P$ which comprises resistances 19 and 20.

Now, for purposes of explanation, let $i_3$ be the alternating current passing through $R_P$. In equilibrium, $R_1$ is such that $V_C = V_D$ and the current is zero through the null meter (not shown).

The current $i_2$ passes through $R_2$, and the current $i_1 = i_3$ passes through $R_1$. (The direction shown corresponds to the actual directional currents.)

Now, Ohm's law can be written for the branch DEC:

$$V_o - V_c = -R_1(i_1 - i_3) + R_2 i_2 = 0 \qquad \text{Eq. 26}$$

$$D_1 i_3 = -R_1 i_1 + R_2 i_1 \qquad \text{Eq. 27}$$

For branches ERpF and $Er_b r_e F$ $$V_c - V_e = R_p i_3 = r_b i_1 + r_e(i_1 + i_2) \qquad \text{Eq. 28}$$

If the last two equalities are divided member by member, and $g'_c$ is substituted for $i_2/i_1$, then one obtains $$\frac{R_1}{R_p} = \frac{-R_1 i_1 + R_2 i_2}{(r_b + r_e)i_1 + r_e i_2} = \frac{-R_1 + R_2 g'_c}{r_b + r_e + r_e g'_c} \qquad \text{Eq. 29}$$

$$R_1(r_b + r_e + r_e) g'_c = R_p(-R_1 R_2 g'_c) \qquad \text{Eq. 30}$$

$$(R_p R_z - R_1 r_e) g'_c = R_1(R_p + r_b + r_e) \qquad \text{Eq. 31}$$

$$g'_c = \frac{R_1}{R_z} \frac{(R_p + r_b + r_e)}{(R_p + R_1/R_2 r_e)} \qquad \text{Eq. 32}$$

but $r_e \ll R_p$ and $$g'_c \approx \frac{R_1}{R_2} \frac{\left(1 + \frac{r_b}{R_p}\right)}{1 + R_1/R_2 \cdot \frac{r_e}{r_b}} \approx \frac{R_1}{R_2}\left[1 + \frac{1}{R_p}\left(r_b - \frac{R_1}{R_2} r_e\right)\right]$$

Eq. 33

$$g'_c = \frac{R_1}{R_2}\left[1 + \frac{1}{R_p}(r_b - g'_c r_e)\right] \qquad \text{Eq. 34}$$

However, $r_b$ and $g'_c r_e$ are of the order of ($10^{-3} R_p$) and thus $$g'_c \approx R_1/R_2 \qquad \text{Eq. 35}$$

As should be apparent from Equation 35, here again variable resistance element 24 ($R_1$) is calibrated to read in units of $R_1/R_2$, or specifically is calibrated to read $h_{21}$ directly. The preceding independent expression of $R_S$ supplies the error of measurement on $g'_c$ inherent in the operation of $R_p$. It will be recalled that independently of all measuring processes, we can easily obtain for $g'_c$ in terms of the charge resistance, the following:

*Determination of the dynamic output conductance of a transistor, i.e. reciprocal of a dynamic output resistance collector-emitter of a transistor when the base is in open circuit*

$$g_o' = r_m - r_e/r_c - r_m + r_e + R_s + R_2$$

$$\approx r_m/r_c - r_m + R_s \qquad \text{Eq. 36}$$

and where $$R_S = 0 \quad h_{21e} \approx R_1/R_2$$

FIGURE 8 presents the circuit which exists when the movable contact arms of the switching elements of switching means 1 are moved to position $d$ of FIGURE 1.

In this circuit, the calibrated resistance element 24 (or $R_1$) forms the branch CD of the bridge. A new resistance $r_2$ forms branch AD of the bridge, and this new resistance comprises resistance element 22. Similarly, a new resistance element 30 (or $r_1$) forms branch AC of the bridge. The transistor is coupled in the branch BC of the bridge, and the feed circuit therefor is coupled between point C and the collector. The emitter is coupled with point B.

As with previous circuits, feed network comprises the battery 15, milliammeter 17, and rheostat 16 coupled in series with the collector. Similarly, the polarization circuit comprises the battery 18, the polarization rheostat 20, and the projective resistance 19 coupled between the base and emitter.

The source of alternating voltage in this instance comprises the secondary transformer 6, and associated dividing network, which is coupled between points A and C of the bridge. The null indication means 8 is coupled between points B and D of the bridge so as to indicate balance thereof upon adjustment of the adjustable resistance element 24.

The resistance 30, and the resistance $R_X$ which comprises that part of the voltage dividing network in circuit, form a low resistance through which the battery 15 feeds the transistor under study. The resistance 22 is coupled in the circuit so as to reduce parasitic complications.

The alternating signal developed by service 6 faces an effective Wheatstone bridge comprising the output circuit of the transistor, the adjustable resistance element 24, and the resistances 22 and 30. At equilibrium, the graduated drum or calibrated scale of the adjustable resistance element 24 gives directly the value of the output resistance, i.e., the value of the dynamic conductance for the operating point under consideration of the transistor being studied.

During the foregoing operations, it will be noted that the switch 16' remains closed.

*Theory of operation of the circuit of FIGURE 8*

With the circuit of FIGURE 8 the output circuit of the transistor is connected into the arm BC of the bridge. A fixed resistance $r_1$ which is relatively weak, is in series with the alternating source and comprises an exterior resistance through which the battery 15 (or $E_1$) feeds the transistor. Hence, the impedance of the source also has to be of a low value, which is compatible with the signal necessarily inherent in other measures.

The resistance $r_1$ has been chosen in such a way that for the total deviation of the milliammeter, the drop of DC potential at the output of the transisor stays larger than 1.5 volts.

The resistance $r_2$ provides an accessible terminal coupled between ground and the resistance $r_1$. Resistance $r_2$ must be chosen to be very weak in order to reduce the disturbances on the visual indicator in accordance with a non-restraining rate; even though this does not enter into the calculations it is imperative for all practical standpoints. Furthermore, $r_2$ must be so related to $r_1$ that it constitutes a power of 10 thereof. This is necessary so that the adjusting resistance, i.e., element 24 or R includes in its range the transistors of weak and medium power.

Two values of $r_1$ and $r_2$ can be found. The variable rheostat $R_1$ which is placed in the branch CD does not modify $I_c$, the collector current nor $V_c$, the collector voltage. In equilibrium, one cancels the voltage which amounts to $1/100$ of the E.M.F. of the applied signal. Because of the extreme weakness of the signal to be cancelled, the second amplification stage of the null indicator often becomes necessary.

One special case exists in connection with the circuit of FIGURE 8. Consider the following. From the equation wherein the transistor is regarded as a quadripole, one obtains the following for the blocked impedance:

$$r_{ce} = r_c \frac{r_e(R_p+r_b)/r_c+r_e+r_b+R_p(1-\alpha)}{r_e+r_b+R_p}$$

when $$R_p+r_p \gg r_e, \quad r_{ec} \approx (1-\alpha)r_c = r_e - r_m$$

or exactly $(r_c-r_m+r_e)$, which is almost always obtained.

If $R_p \to \infty$, then $r_{ce} \to 1h_{22e}$ by definition, and the protection resistance placed in the polarization circuit suffices, then $$h_{22e} = K \frac{1}{R_1} \text{ with } K = \frac{r_2}{r_1}$$

or here $= 1/10e$.

The graduated scale carried by the adjustable resistance element $R_1$ thus permits the direct reading of R and of $K[1/(R_1)]$.

*Determination of a dynamic output conductance with a common base circuit—$h_{22b}$*

The circuit presented in FIGURE 9 represents that which is established as a result of moving the movable contact arms of the switching elements of switching means 1 of FIGURE 1 to position e thereof. The circuit of FIGURE 9 corresponds almost identically with the circuit of FIGURE 8, except that the transistor is coupled in circuit with a common base, and certain substitute resistance elements are used. More particularly, a low polarization resistance 31 replaces the polarization resistance 19 used in former circuits, and the alternating signal emanating from the source 6 is applied to the base by means of a low value resistance 32 which replaces the resistance 22 of the circuit of FIGURE 8. One additional change need be made, and that is to replace the resistance 22 ($r_2$) of the circuit of FIGURE 8 with the resistance 27 [$1/(R2)$]. Although not specifically a change, with the measurement of FIGURE 9, a high value is imparted to the polarization rheostat 20.

To obtain the dynamic output conductance with a common base, or the output impedance of the transistor with a common base as it is sometimes called, one merely adjusts the adjustable resistor element 24 or $1_R$ and reads directly the value from the calibrated scale thereof.

*Theory of operation of the circuit of FIGURE 9*

The operating principles of the circuit of FIGURE 9 correspond identically with the operating principles of the circuit of FIGURE 8. One difference lies in the fact that $r_1$ is fixed at a lower value so that for every transistor $I_E$ the emitter current $\approx I_c$ the collector current. The relationship here again has been chosen such that $r_2/r_1 = 1/100$. The sensitivity in this instance drops to about $1/10$ of the sensitivity with the circuit of FIGURE 8. Accordingly, with the circuit of FIGURE 9 two amplification stages and an alternating applied signal of several volts are indispensable.

One still reads R and $k$ on the calibrated scale with $k = r_2/r_1$, or here $1/100$.

From the basic "block box" equations for a common base construction, namely, $$v_1 = (r_b+r_e)i_1+r_b i_2$$

$$v_2 = (r_m+r_b)i_1+(r_c r_b)i_2$$

one obtains for the blocked impedance $$r_{cb} = r_c\left[\frac{r_b+r_e/r_c+r_e+r_b(1-\alpha)+R_p}{r_e+r_b+R_p}\right]$$

$$\approx \frac{r_e+r_b(1-\alpha)+R_p}{r_e+r_b+R_p}$$

If $R_p \to \infty$, then $r_{eb} \to 1h_{22b}$ by definition.

In this instance, however, where $h_{22b} = 1/r_{cb}$, $R_p \gg r_b$ and this is a condition less often realized than the inequality of the corresponding point in a common emitter construction. Furthermore, in the present arrangement $I_E \approx I_c$ and thus $R_p$ would most likely be smaller here than for a measurement of $h_{22E}$, but this presents no problem.

For this measure, however, one must have $R_p \gg r_b$.

To achieve this, $R_p$ as indicated on the polarization rheostat is compared with the result of the measurement of $h_{11e}$ which raises $r_b$.

Under these conditions $$h_{22b} = k(1/R)$$

with $$k = r_2/r_1 = 1/100$$

*Determination of transistor distortion*

The circuit of FIGURE 10 represents the system which is provided when the movable arms of the switching elements of the switching means 1 of FIGURE 1 are moved to position f. This circuit or system represents a standard common emitter transistor circuit with which terminals 35 are provided for purposes of enabling the system to be coupled with a conventional cathode ray oscilloscope. Of course, the oscilloscope connection is made in order to judiciously establish an operating point for the transistor to be studied.

A signal is applied to the transistor 3 under study from the secondary 7, or more particularly the switching means 5 coupled with the voltage divider therefor. This signal is applied to the base 3B through the condenser 28.

Two terminals 33 are provided so that a milliammeter can be coupled in the input circuit of the transistor in order to easily measure the polarization current. However, since the EMF E2 of the battery 18 is known, and since the polarization resistance $R_p$ equal to the sum of resistances 19 and 20 is known, the value of the polarization current is very substantially equal to $E_2/R_p$, because $R_p$ is very large in comparison to the input resistance of the transistor (a case of the so-called "control by current").

The collector 3C of the transistor studied is connected by means of a condenser 34 of high capacity through the cathode ray oscilloscope which, as suggested, is coupled between the terminals 35.

*Theory of operation of circuit of FIGURE 10*

With the circuit of FIGURE 10, as with the circuit of FIGURE 2, a signal of varying amplitude is applied to the base of the transistor through a condenser, namely condenser 28 in this instance. The condenser discharges through the transistor into the resistance 16 (or $R_S$) which is variable. As also suggested, the terminals 33 are provided so that a microammeter can be inserted into the input circuit to determine the polarization current $I_b$. But even in this auxiliary instrument, the polarization battery 18 (or $E_2$) is of known EMF as long as $R_p$ is much greater than $r_{be}$. This is the general case in "current drive" and thus one obtains $I_b = E_2/R_p$.

The transistor is fed through the variable resistance 16 (or $R_S$) by the battery 15 (or $E_1$), and the milliammeter inserted in this output circuit makes $I_c$ the collector current known. The feeding voltage applied across the transistor is then $V_{CE}=E_1-R_SI_C$.

Since one can choose $E_1$, $R_p$, and $R_S$, one can govern $V_{BE}$, $I_B$, $V_{CE}$, and $I_c$ as desired. The operating point can accordingly be fixed at its optimal positon and read, for example, as the greatest voltage $v_{be}$ which can be applied to the base without distortion. In the absence of conditions imposed in advance, all of these values can be preserved for the measurement of the parameters and coefficients as outlined in the preceding sections of the present specification. In other words, initially one can determine the operating point or points of the transistor to be tested by means of oscilloscope distortion reading, and this operating point can be maintained throughout remaining operations to determine the $h$ coefficients.

Special consideration

While attention was only directed to the indicating means 8 hereinabove briefly, it will be appreciated that the construction thereof is important as it eliminates the provision of an abundance of batteries as well as possible complicated coupling between the amplifiers and the tested transistor. The circuit comprises basically only the elements described above, namely a double miniature diode plate connected, assembled in a rectifying position, so as to furnish a high voltage to the cathodic cross, with a superficial filtration provided by the resistance and condenser unit 12. The return of the high voltage through the suitable resistance network permits the continuous feeding of the two amplifier transistors, and thus a minimum of connections is needed.

While we have only summarily discussed the function provided by the switching means 2 hereinabove, it will be appreciated that such switching means comprises a plurality of elements which allow for making the collector emitter voltage either $=3$, $=6$, and $=9$ volts for NPN transistors undergoing test or $-3$, $-6$, and $-9$ volts for PNP transistors undergoing test.

Moreover, while no detailed consideration has been given to the calibrated scale provided for resistance element 24 ($R_1$), it will be appreciated by those of ordinary skill in the art that such scale can be suitably arranged and calibrated to take a form such as that shown in FIGURE 12, and designated by numeral 200.

It will be remembered that FIGURE 12 presents the face of an instrument constructed in accordance herewith, and by again referring thereto it will be seen that (a) numeral 217 designates the face of meter 17; (b) numeral 201 designates the control knob for switching means; (c) numeral 216 designates the control knob for resistance 16; (d) numeral 220 designates the control knob for polarization resistance 20; (e) numeral 202 designates the control knob for switching means 2; and (f) numeral 204 designates the control knob for the input transformers 4 and 5.

Simplified overall system

Having now described system operation for each measurement made, it should be apparent that in essence, the same comprises a plurality of interconnected elements in each instance which establish for determination of any $h$ coefficient, an effective network centered about a basic bridge circuit.

In FIGURE 11, the bridge circuit is designated by numeral 100. This bridge is formed from a gauge element generally designated as 102 (resistance element 24), supply of impedance element generally designated as 104, and the transistor 3 undergoing test. Coupled with the bridge is the feed therefor generally designated as 108, and the balance indicator 8 comprising an amplifier generally designated as 110 and a visual indicator generally designated as 112. In addition to the above, the system includes a transistor polarizing network generally designated as 114 and a transistor feed network generally designated as 116.

It will be understood that while new numerals have been used in certain instances in FIGURE 11, they designate boxes incorporating the corresponding elements discussed above. For example, box 114 comprises resistances 19, 20 and 31 and battery 18.

Control for the system is provided by the switching means generally designated in FIGURE 11 by numeral 120. This switching means is coupled to each of the other boxes as shown so as to establish the suitable connections.

Conclusion

After reading the foregoing description of the illustrative and preferred embodiments of the invention presented in the annexed drawings, it should be apparent that the objects set forth at the outset of this specification have been successfully achieved. Various modifications may occur to those of ordinary skill in the art, and thus it is intended that such description be interpreted as illustrative, rather than in a limiting sense.

Accordingly, what is claimed is:

1. A system for determining the dynamic resistance, the inverse voltage gain, the dynamic output conductance, the direct current amplification and the direct maximum current amplification of a transistor comprising a plurality of resistances and capacitors, at least one source of power, a unitary switching means for selectively coupling in a bridge-type circuit said resistances, capacitances, and source of power with the transistor to operate the same, means for adjusting circuit conditions to a predetermined state successively indicative of each of said transistor characteristic to be determined, and means for indicating when said state exists, wherein said dynamic resistance is determined by a Wheatstone bridge circuit having two pairs of opposed terminals, means for applying a signal across one pair of opposed terminals thereof, and an indicating instrument coupled across the other pair of opposed terminals thereof, wherein one branch of said Wheatstone bridge circuit coupled between one terminal of each of said pairs of terminals comprises the emitter-base junction of the transistor, a condenser coupled in series therewith, a bias network coupled in parallel across said junction, and a collector network coupled across the emitter-collector junction of the transistor.

2. A system as defined in claim 1 wherein said collector network comprises a DC voltage supply, variable resistance means, and a current indicator coupled in series.

3. A system as defined in claim 2 wherein said bias network coupled in parallel has an impedance value which substantially matches the impedance of said condenser coupled in series.

4. A system as defined in claim 3 wherein said collector network includes means for short-circuiting said variable resistance means forming part thereof, and a parallel resistance-capacitance coupled in parallel to said source of DC voltage.

5. A system for determining the inverse voltage gain of a transistor comprising a Wheatstone bridge circuit having a first and a second pair of opposed terminals, means for applying a signal across said first pair of opposed terminals thereof, and an indicating instrument coupled across said second pair of opposed terminals thereof, wherein one branch of said Wheatstone bridge circuit coupled between one terminal of each of said pairs of terminals comprises the emitter base junction of the transistor, and wherein another branch of said bridge circuit coupled between a first and a second terminal of said second pair of terminals includes the collector base junction of said transistor.

6. A system for determining the inverse voltage gain of a transistor comprising a Wheatstone bridge circuit having a first and a second pair of opposed terminals, means for applying a signal across said first pair of opposed terminals thereof, and an indicating instrument coupled across said second pair of opposed terminals thereof, wherein one branch of said Wheatstone bridge circuit coupled between one terminal of each of said pairs of terminals comprises the emitter base junction of the transistor, and wherein another branch of said bridge circuit coupled between a first and a second terminal of said second pair of terminals includes the collector base junction of said transistor, and further including a bias network coupled across the emitter-collector terminals of the transistor, and a feed network coupled in series with said collector base junction in said other branch of said bridge circuit.

References Cited

UNITED STATES PATENTS 2,911,594  11/1959  Knight et al. _____ 324—158

OTHER REFERENCES

Bohr, Radio-Electronics Magazine, August 1954, pp. 30–32.

"A Bridge for Measuring the A.C. Parameters of Junction Transistors," A. R. Boothroyd et al., The Proceedings of the Institute of Electrical Engineers, September 1954, pp. 314–316. 324—158T.

"The Measurements of the Small-Signal Characteristics of Transistors," E H. Cooke-Yarborough et al., The Proceedings of the Institute of Electrical Engineers, September 1954, pp. 288–293. 324—158T.

"Bridges Measure Transistor Parameters," L. J. Giacoletto, Electronics, November 1953, pp. 144–147.

Hendrick, Electronics Magazine, Aug. 1, 1957, 324—158, pp. 174–176.

"Junction Transistor Test Set," Dwight V. Jones, Radio Electronic Engineering, March 1955, pp. 7–9, 33 and 34.

Padgett, Radio Electronics Magazine, September 1955, pp. 48–50.

Proceedings of the IRE, November 1956, 324—158, pp. 1542–1556.

RUDOLPH V. ROLINEC, *Primary Examiner.*

WALTER L. CARLSON, *Examiner.*

G. S. KINDNESS, E. L. STOLARUN,
*Assistant Examiners.*